(12) United States Patent
Kotake et al.

(10) Patent No.: US 11,359,924 B2
(45) Date of Patent: Jun. 14, 2022

(54) INFORMATION PROCESSING APPARATUS AND INFORMATION PROCESSING METHOD

(71) Applicant: TOYOTA JIDOSHA KABUSHIKI KAISHA, Toyota (JP)

(72) Inventors: Kosuke Kotake, Nagoya (JP); Ryosuke Tanimura, Toyota (JP); Yuki Ito, Iwakura (JP); Akira Nishida, Toyota (JP); Zekai Qiu, Nisshin (JP); Kenichi Hagiya, Nagoya (JP); Naoki Yamamuro, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 373 days.

(21) Appl. No.: 16/537,652

(22) Filed: Aug. 12, 2019

(65) Prior Publication Data

US 2020/0049521 A1    Feb. 13, 2020

(30) Foreign Application Priority Data

Aug. 10, 2018   (JP) .............................. JP2018-151659

(51) Int. Cl.
   *G01C 21/34*      (2006.01)
   *G06Q 50/30*      (2012.01)
(52) U.S. Cl.
   CPC ....... *G01C 21/3438* (2013.01); *G01C 21/343* (2013.01); *G06Q 50/30* (2013.01)

(58) Field of Classification Search
   CPC .................................................. G01C 21/3438
   See application file for complete search history.

(56) References Cited

U.S. PATENT DOCUMENTS

| | | | |
|---|---|---|---|
| 10,415,983 B2* | 9/2019 | Ramalingam | G01C 21/3438 |
| 2020/0049521 A1* | 2/2020 | Kotake | G01C 21/343 |
| 2020/0327494 A1* | 10/2020 | Qiu | H04N 1/32368 |
| 2020/0355507 A1* | 11/2020 | Shitara | G05D 1/0212 |

FOREIGN PATENT DOCUMENTS

| | | |
|---|---|---|
| JP | 2011-237842 A | 11/2011 |
| JP | 2014-191725 A | 10/2014 |
| JP | 62-03443 B1 | 9/2017 |

* cited by examiner

*Primary Examiner* — Michael A Berns
(74) *Attorney, Agent, or Firm* — Oliff PLC

(57) ABSTRACT

An information processing apparatus determines whether or not a predetermined transfer condition for urging a target user sharing a ride in a ride-sharing vehicle with another user with a different destination to transfer between ride-sharing vehicles during movement is established, on the basis of a predicted travel route of each of a transfer source vehicle and a transfer destination vehicle. Then, in the case where the predetermined transfer condition is determined to be established, the information processing apparatus transmits transfer information for urging the target user to transfer from the transfer source vehicle to the transfer destination vehicle during movement, to a terminal associated with the transfer source vehicle and a terminal associated with the transfer destination vehicle.

5 Claims, 11 Drawing Sheets

VEHICLE INFORMATION

| VEHICLE ID | USER INFORMATION | | CURRENT POSITION |
|---|---|---|---|
| | USER ID | DESTINATION | |
| ID101V | ID001 | LOCATION A | Y1Y1 |
| | ID002 | LOCATION B | |
| ID102V | ID003 | LOCATION C | Y2Y2 |
| | ID004 | LOCATION D | |
| ... | ... | ... | ... |

Fig. 4

TRANSFER INFORMATION

| TRANSFER SOURCE | TRANSFER DESTINATION | TARGET USER | TRANSFER LOCATION |
|---|---|---|---|
| ID101V | ID102V | ID001 | LOCATION X1 |

Fig. 6

INFORMATION PROCESSING APPARATUS AND INFORMATION PROCESSING METHOD

CROSS REFERENCE TO THE RELATED APPLICATION

This application claims the benefit of Japanese Patent Application No. 2018-151659, filed on Aug. 10, 2018, which is hereby incorporated by reference herein in its entirety.

BACKGROUND

Technical Field

The present disclosure relates to an information processing apparatus, and an information processing method.

Description of the Related Art

In recent years, use of so-called ride-sharing, which is a mode of transport in which a plurality of users share a ride (carpool) in one vehicle, is becoming widespread. A technology for matching a plurality of users is being developed to allow such use of ride-sharing.

Moreover, Patent document 1 discloses a technology for determining whether or not holders of respective terminals are sharing a ride in one vehicle.

CITATION LIST

Patent Document

[Patent document 1] Japanese Patent Laid-Open No. 2011-237842

SUMMARY

The present disclosure has its object to provide a technology for enabling a user using ride-sharing to efficiently move to a destination.

An information processing apparatus according to a first aspect of the present disclosure may include a controller configured to:

determine, on a basis of a predicted travel route of each of a transfer source vehicle and a transfer destination vehicle, whether or not a predetermined transfer condition is established, the predetermined transfer condition being for urging a target user sharing a ride in the transfer source vehicle with another user with a different destination to transfer from the transfer source vehicle to the transfer destination vehicle during movement; and transmit, in a case where the predetermined transfer condition is determined to be established, transfer information to a terminal associated with the transfer source vehicle and a terminal associated with the transfer destination vehicle, the transfer information being for urging the target user to transfer from the transfer source vehicle to the transfer destination vehicle during movement.

An information processing method according to a second aspect of the present disclosure may be performed by a computer, the method including the steps of:

determining, on a basis of a predicted travel route of each of a transfer source vehicle and a transfer destination vehicle, whether or not a predetermined transfer condition is established, the predetermined transfer condition being for urging a target user sharing a ride in the transfer source vehicle with another user with a different destination to transfer from the transfer source vehicle to the transfer destination vehicle during movement; and transmitting, in a case where the predetermined transfer condition is determined to be established, transfer information to a terminal associated with the transfer source vehicle and a terminal associated with the transfer destination vehicle, the transfer information being for urging the target user to transfer from the transfer source vehicle to the transfer destination vehicle during movement.

A non-transitory storage medium according to a third aspect of the present disclosure may be a non-transitory storage medium storing a program for causing a computer to:

determine, on a basis of a predicted travel route of each of a transfer source vehicle and a transfer destination vehicle, whether or not a predetermined transfer condition is established, the predetermined transfer condition being for urging a target user sharing a ride in the transfer source vehicle with another user with a different destination to transfer from the transfer source vehicle to the transfer destination vehicle during movement; and transmit, in a case where the predetermined transfer condition is determined to be established, transfer information to a terminal associated with the transfer source vehicle and a terminal associated with the transfer destination vehicle, the transfer information being for urging the target user to transfer from the transfer source vehicle to the transfer destination vehicle during movement.

According to the present disclosure, a user using ride-sharing is enabled to more efficiently move to a destination.

BRIEF DESCRIPTION OF THE DRAWINGS

FIG. 4 is a diagram illustrating an example of a table structure of vehicle information that is stored in a vehicle information DB;

FIG. 6 is a diagram illustrating an example of a table structure of transfer information that is generated by the transfer information process;

DESCRIPTION OF THE EMBODIMENTS

Figure 1:
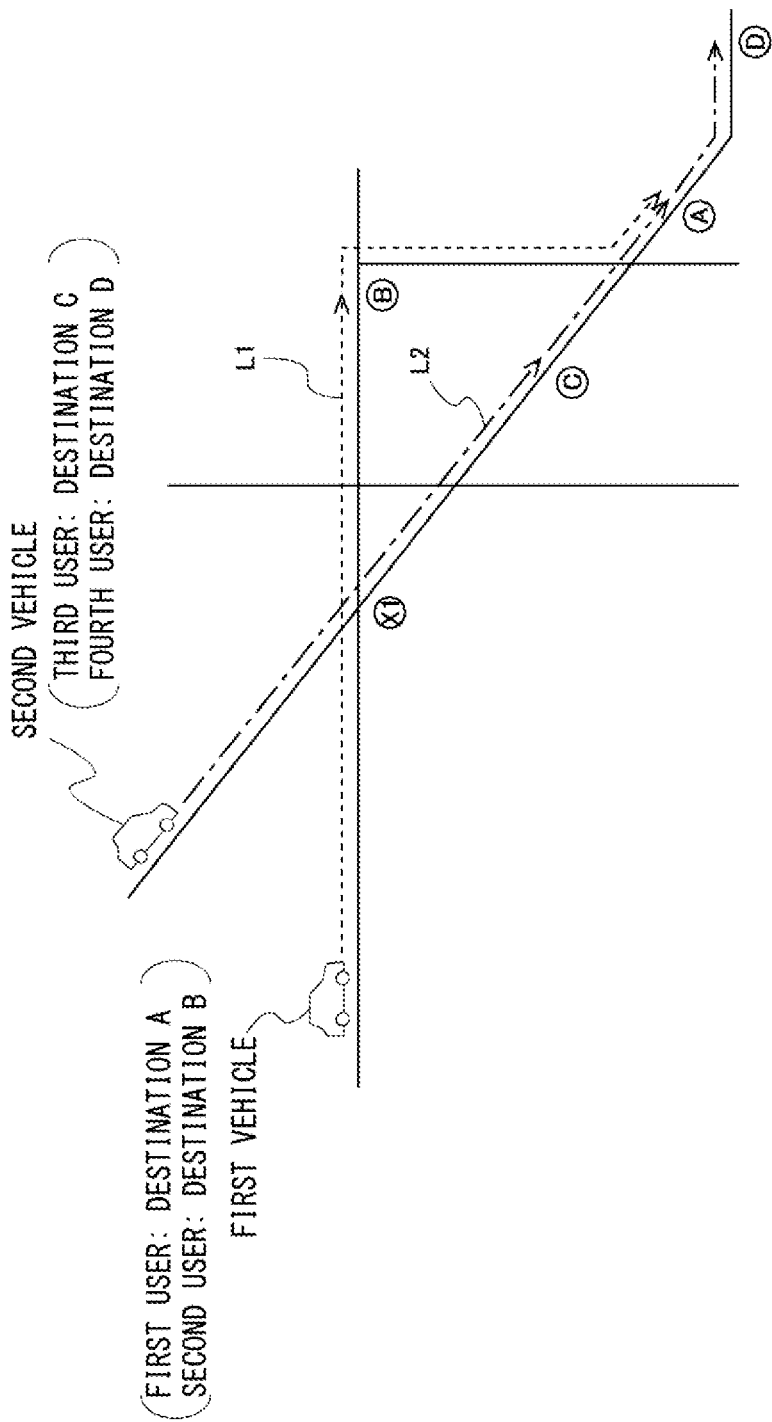
FIG. 1 is a first diagram for describing transfer between ride-sharing vehicles in a ride-sharing system.

A plurality of users with different destinations sometimes share a ride in a vehicle that is used for ride-sharing (hereinafter referred to also as "ride-sharing vehicle"). In this case, first, one ride-sharing vehicle moves to the destination of one user, and then, after the one user gets off, the ride-sharing vehicle moves to the destination of another user. Accordingly, depending on a positional relationship between the destinations of the users sharing a ride in one ride-sharing vehicle, there is possibly a user who is made to move to the destination in a roundabout way. Such a user may possibly move to his/her destination more efficiently by transferring between the ride-sharing vehicles during movement.

Accordingly, with an information processing apparatus according to a first aspect of the present disclosure, a controller may determine whether or not a predetermined transfer condition is established for a target user who is on board a transfer source vehicle that is one ride-sharing vehicle. The predetermined transfer condition here is a condition for urging the target user sharing a ride in the transfer source vehicle with another user with a different destination to transfer to a transfer destination vehicle that is another ride-sharing vehicle. The transfer source vehicle and the transfer destination vehicle here are each a ride-sharing vehicle which can be shared by a plurality of users with different destinations. Furthermore, the predetermined transfer condition is set as a condition by which it can be determined that the target user may more efficiently move to his/her destination by transferring to the transfer destination vehicle, which is a ride-sharing vehicle other than the transfer source vehicle, during movement by the transfer source vehicle.

The controller may determine whether or not the predetermined transfer condition is established for the target user, on the basis of a predicted travel route of each of the transfer source vehicle and the transfer destination vehicle. The predicted travel route is a travel route along which each vehicle is predicted to travel in the future. Then, in a case where the predetermined transfer condition is determined to be established for the target user, the controller may transmit transfer information to a terminal associated with the transfer source vehicle and a terminal associated with the transfer destination vehicle, the transfer information being for urging the target user to transfer from the transfer source vehicle to the transfer destination vehicle. Here, a terminal associated with the transfer source vehicle is an in-vehicle apparatus that is installed in the transfer source vehicle or a user terminal carried by the target user, for example. Furthermore, a terminal associated with the transfer destination vehicle is an in-vehicle apparatus that is installed in the transfer destination vehicle or a user terminal carried by a user who is on board the transfer destination vehicle, for example.

By transmitting the transfer information to the terminal associated with the transfer source vehicle, a proposal to transfer from the transfer source vehicle to the transfer destination vehicle may be made to the target user. Furthermore, by transmitting the transfer information to the terminal associated with the transfer destination vehicle, a user on board the transfer destination vehicle may be notified of transfer of the target user from the transfer source vehicle to the transfer destination vehicle. The target user may thus be urged to transfer from the transfer source vehicle to the transfer destination vehicle during movement.

Accordingly, with the information processing apparatus according to the first aspect of the present disclosure, in a case where the predetermined transfer condition is established for a target user, the target user may transfer from the transfer source vehicle to the transfer destination vehicle during movement by the transfer source vehicle. That is, the target user may transfer between vehicles in a case where the target user may more efficiently move to his/her destination by transferring between vehicles during movement. Accordingly, a user using ride-sharing may more efficiently move to the destination.

Hereinafter, specific embodiments of the present disclosure will be described with reference to the drawings. Dimensions, materials, shapes, relative positions and the like of structural components described in the present embodiments are not intended to limit the technical scope of the disclosure unless specified otherwise.

First Embodiment (Transfer Between Ride-Sharing Vehicles)

FIG. 1 is a diagram for describing transfer between ride-sharing vehicles in a ride-sharing system according to a present embodiment. A first vehicle and a second vehicle in FIG. 1 are each a ride-sharing vehicle. A plurality of users who are matched on the basis of respective departure points and destinations may ride in each ride-sharing vehicle. In FIG. 1, a first user and a second user share a ride in the first vehicle, and a third user and a fourth user share a ride in the second vehicle. The first user is a user whose destination is a location A, and the second user is a user whose destination is a location B. Moreover, the third user is a user whose destination is a location C, and the fourth user is a user whose destination is a location D.

Furthermore, in FIG. 1, an arrow L1 (broken line arrow) indicates a predicted travel route that is predicted as a travel route of the first vehicle. Moreover, in FIG. 1, an arrow L2 (dash-dotted line arrow) indicates a predicted travel route that is predicted as a travel route of the second vehicle. As indicated by the arrow L1 in FIG. 1, the predicted travel route of the first vehicle is a route that heads to the location A, which is the destination of the first user, through the location B, which is the destination of the second user. On the other hand, as indicated by the arrow L2 in FIG. 1, the predicted travel route of the second vehicle is a route that heads to the location D, which is the destination of the fourth user, through the location C, which is the destination of the third user.

Here, in FIG. 1, because the first vehicle heads to the location A after passing through the location B, the first vehicle travels to the location A without using a shortest route. Accordingly, the first user is made to move to his/her destination in a roundabout way. However, the predicted travel route of the first vehicle (arrow L1) and the predicted travel route of the second vehicle (arrow L2) intersect at a location X1. The location X1 is a location which is before the location B, which is the destination of the second user, on the travel route of the first vehicle. Moreover, the location A is located between the location C and the location D on the predicted travel route of the second vehicle (arrow L2). Accordingly, the first user may arrive earlier at the location A by transferring from the first vehicle to the second vehicle at the location X1, than by staying on board the first vehicle.

In the ride-sharing system according to the present embodiment, in a case where a target user may more efficiently move to his/her destination by transferring between the ride-sharing vehicles during movement, as in the case of the first user, transfer of the target user between the ride-sharing vehicles is urged. In the following, the ride-sharing system according to the present embodiment will be described in greater detail.

(Outline of System)

Figure 2:
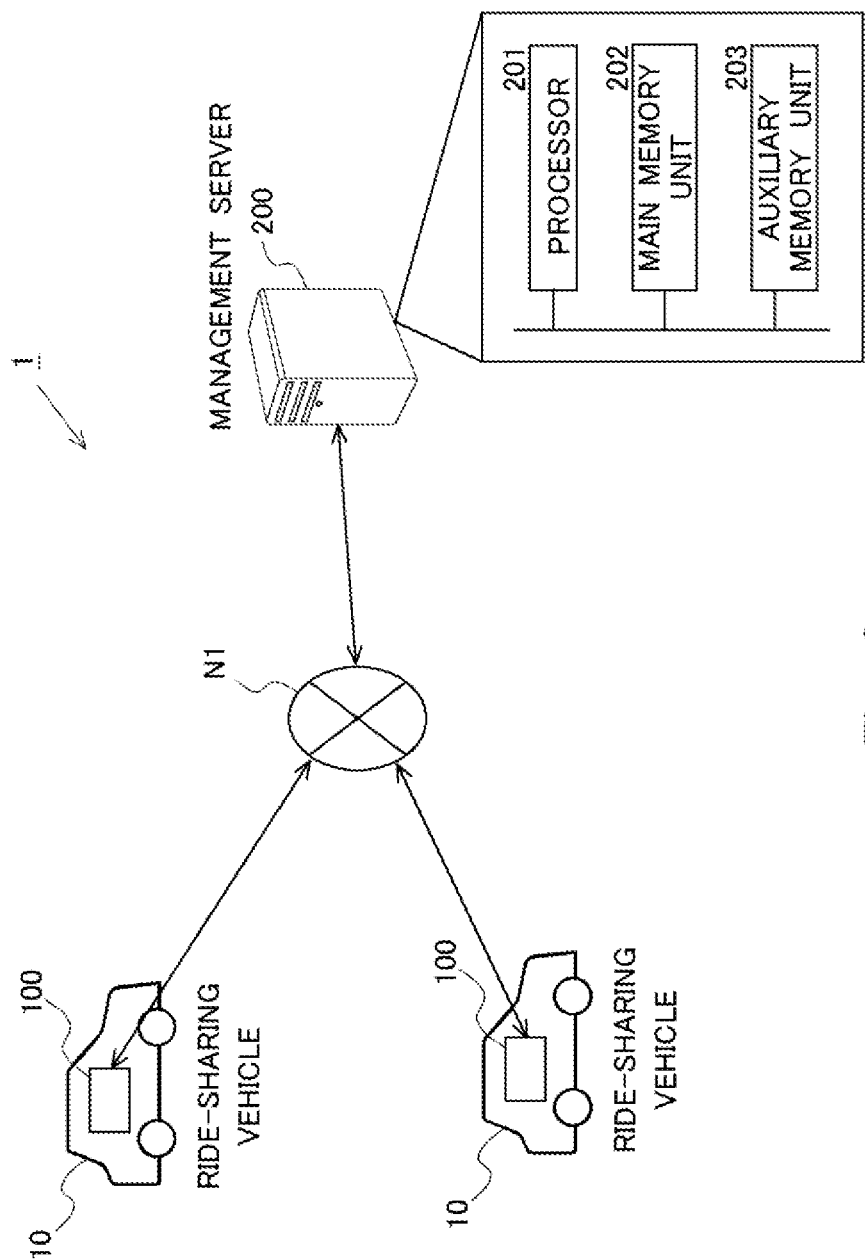
FIG. 2 is a diagram illustrating a schematic configuration of an information processing system according to a first embodiment.

FIG. 2 is a diagram illustrating a schematic configuration of the ride-sharing system according to the present embodiment. A ride-sharing system 1 includes an in-vehicle apparatus 100 installed in each ride-sharing vehicle 10, and a management server 200.

In the ride-sharing system 1, each in-vehicle apparatus 100 and the management server 200 are connected to each other over a network N1. For example, as the network N1, a wide area network (WAN), which is a worldwide public communication network such as the Internet, or other communication networks may be adopted. Furthermore, the network N1 may include a mobile communication network for mobile phones, or a wireless communication network such as Wi-Fi.

One or a plurality of users who use the present system, and who are matched by the management server 200 are on board each ride-sharing vehicle 10. Furthermore, as described later, the in-vehicle apparatus 100 receives transfer information from the management server 200. The received transfer information is presented to the one or the plurality of users who are on board the ride-sharing vehicle 10.

The management server 200 is a server that performs matching between a user who uses the ride-sharing system and the ride-sharing vehicle 10, and that manages vehicle information that is information about each ride-sharing vehicle 10. The management server 200 is a general computer. As illustrated in FIG. 2, the computer forming the management server 200 includes a processor 201 such as a CPU or a DSP, a main memory unit 202 such as a read only memory (ROM) and a random access memory (RAM), and an auxiliary memory unit 203 such as an EPROM, a hard disk drive (HDD) or a removable medium. Here, the removable medium is a flash memory such as a USB memory or an SD card, or a disk recording medium such as a CD-ROM, a DVD disk or a Blu-ray disc.

An operating system (OS), various programs, various information tables and the like are stored in the auxiliary memory unit 203 of the management server 200. Furthermore, at the management server 200, various functional modules as described later may be implemented by the processor 201 loading the programs stored in the auxiliary memory unit 203 into the main memory unit 202, and executing the programs. However, a part or all of the functional modules of the management server 200 may be implemented by a hardware circuit such as an ASIC or an FPGA. Additionally, the management server 200 does not necessarily have to be achieved by a single physical configuration, and may be formed by a plurality of computers operating in coordination.

Moreover, the management server 200 receives, from a user terminal carried by each user who uses the present system, user information including information about a departure point and a destination at the time of a respective user riding in the ride-sharing vehicle 10. Then, the management server 200 matches one or a plurality of users with each ride-sharing vehicle 10 on the basis of the user information on each user. Furthermore, the management server 200 manages, as vehicle information, the user information on each user matched with each ride-sharing vehicle 10, in association with the ride-sharing vehicle 10.

Furthermore, the management server 200 performs a transfer information process on the basis of the vehicle information about each ride-sharing vehicle 10. The transfer information process here is a process, as described above, of urging a target user to transfer between the ride-sharing vehicles 10 during movement. Additionally, details of the transfer information process will be given later.

(System Configuration)

Figure 3:
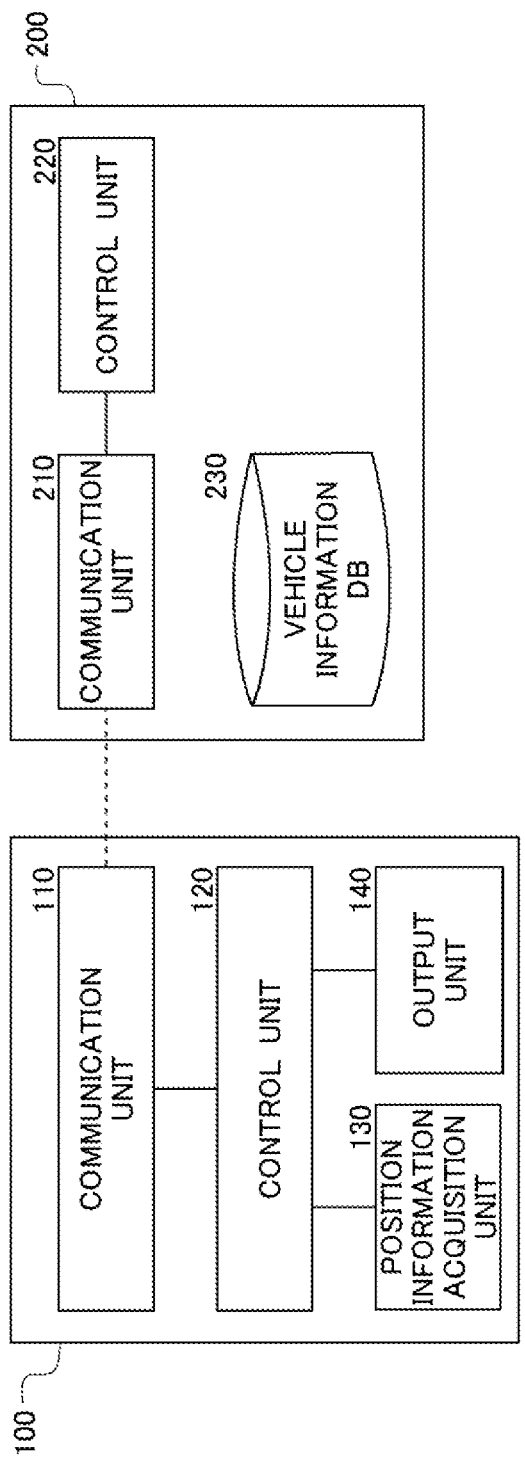
FIG. 3 is a block diagram schematically illustrating an example configuration of each of an in-vehicle apparatus and a management server forming a ride-sharing system according to the first embodiment.

Next, a functional configuration of each of the in-vehicle apparatus 100 and the management server 200 forming the ride-sharing system 1 according to the present embodiment will be described with reference to FIG. 3. FIG. 3 is a block diagram schematically illustrating an example of a configuration of each of the in-vehicle apparatus 100 and the management server 200 forming the ride-sharing system 1 according to the present embodiment.

(In-Vehicle Apparatus)

The in-vehicle apparatus 100 includes a computer including a processor, a main memory unit, and an auxiliary memory unit. The in-vehicle apparatus 100 includes a communication unit 110, a control unit 120, a position information acquisition unit 130, and an output unit 140. The communication unit 110 is communication means for connecting the in-vehicle apparatus 100 to the network N1. For example, the communication unit 110 may communicate with other apparatuses including the management server 200 over the network N1, by using a mobile communication service such as 3rd Generation (3G) or Long Term Evolution (LTE).

Furthermore, the control unit 120 includes a function of performing arithmetic processing for controlling the in-vehicle apparatus 100. The control unit 120 may be implemented by the processor. Furthermore, various processes by the control unit 120 may be implemented by the processor loading programs stored in the auxiliary memory unit into the main memory unit, and executing the programs. For example, the control unit 120 performs a process of receiving, through the communication unit 110, transfer information transmitted from the management server 200.

Furthermore, the position information acquisition unit 130 includes a function of acquiring current position information on the ride-sharing vehicle 10 in which the in-vehicle apparatus 100 is installed. Typically, the position information acquisition unit 130 is a global positioning system (GPS) device. The control unit 120 performs a process of transmitting the current position information on the ride-sharing vehicle 10 acquired by the position information acquisition unit 130, to the management server 200 through the communication unit 110.

Moreover, the output unit 140 includes a function of outputting, using a display or the like, information which is to be presented to a user who is on board the ride-sharing vehicle 10. The control unit 120 performs a process of outputting the transfer information received from the management server 200, by using the output unit 140.

(Management Server)

The management server 200 includes a communication unit 210, a control unit 220, and a vehicle information database (vehicle information DB) 230. The communication unit 210 is means for connecting the management server 200 to the network N1. For example, the communication unit 210 includes a local area network (LAN) interface board, or a wireless communication circuit for wireless communication.

The control unit 220 includes a function of performing arithmetic processing for controlling the management server 200. The control unit 220 may be implemented by the processor 201. The control unit 220 performs a process of receiving, through the communication unit 210, user information that is transmitted from each user terminal. Furthermore, the control unit 220 performs a matching process for matching one or a plurality of users with each ride-sharing vehicle 10 on the basis of the user information on each user, and a process of transmitting matching information indicating a result of the matching process to each user terminal through the communication unit 210. Moreover, the control unit 220 performs a process of registering, in the vehicle information DB, vehicle information associating the user information on one or a plurality of users matched with one ride-sharing vehicle 10 with the one ride-sharing vehicle 10.

The vehicle information DB 230 is structured in the auxiliary memory unit 203 by execution of a program of a database management system by the processor 201 of the management server 200. For example, the vehicle information DB 230 is a relational database.

FIG. 4 is a diagram illustrating an example of a table structure of the vehicle information that is stored in the vehicle information DB 230. The vehicle information table includes a vehicle ID field, a user information field, and a current position field. A vehicle ID as identification information allowing specification of the ride-sharing vehicle 10 is input in the vehicle ID field.

Furthermore, a user ID and destination information on one or a plurality of users matched with the ride-sharing vehicle 10 corresponding to the vehicle ID input in the vehicle ID field are input in the user information field. The user ID is identification information allowing specification of each user. The destination information is information indicating a destination of the user corresponding to the user ID. A same number of pieces of user information as the number of users sharing a ride in the ride-sharing vehicle 10 corresponding to the vehicle ID input in the vehicle ID field is input in the user information field. Each piece of information is input in the vehicle ID field and the user information field at a time point of matching of one or a plurality of users with each ride-sharing vehicle 10 performed by execution of the matching process.

Furthermore, the current position information on the ride-sharing vehicle 10 corresponding to the vehicle ID input in the vehicle ID field is input in the current position field. As described above, the management server 200 receives the current position information on each ride-sharing vehicle 10 from the in-vehicle apparatus 100 installed in each ride-sharing vehicle 10. The received current position information is input in the current position field. Accordingly, the current position information input in the current position field is updated every time the current position information is newly received.

Additionally, in the vehicle information table illustrated in FIG. 4, vehicle IDs "ID101V" and "ID102V" indicate vehicle IDs of the first vehicle and the second vehicle in FIG. 1, respectively. Furthermore, in the vehicle information table illustrated in FIG. 4, user IDs "ID001", "ID002", "ID003", and "ID004" indicate user IDs of the first user, the second user, the third user, and the fourth user in FIG. 1, respectively.

Moreover, at the management server 200, the control unit 220 performs the transfer information process on the basis of the vehicle information on each ride-sharing vehicle 10 registered in the vehicle information DB 230.

(Transfer Information Process)

Figure 5:
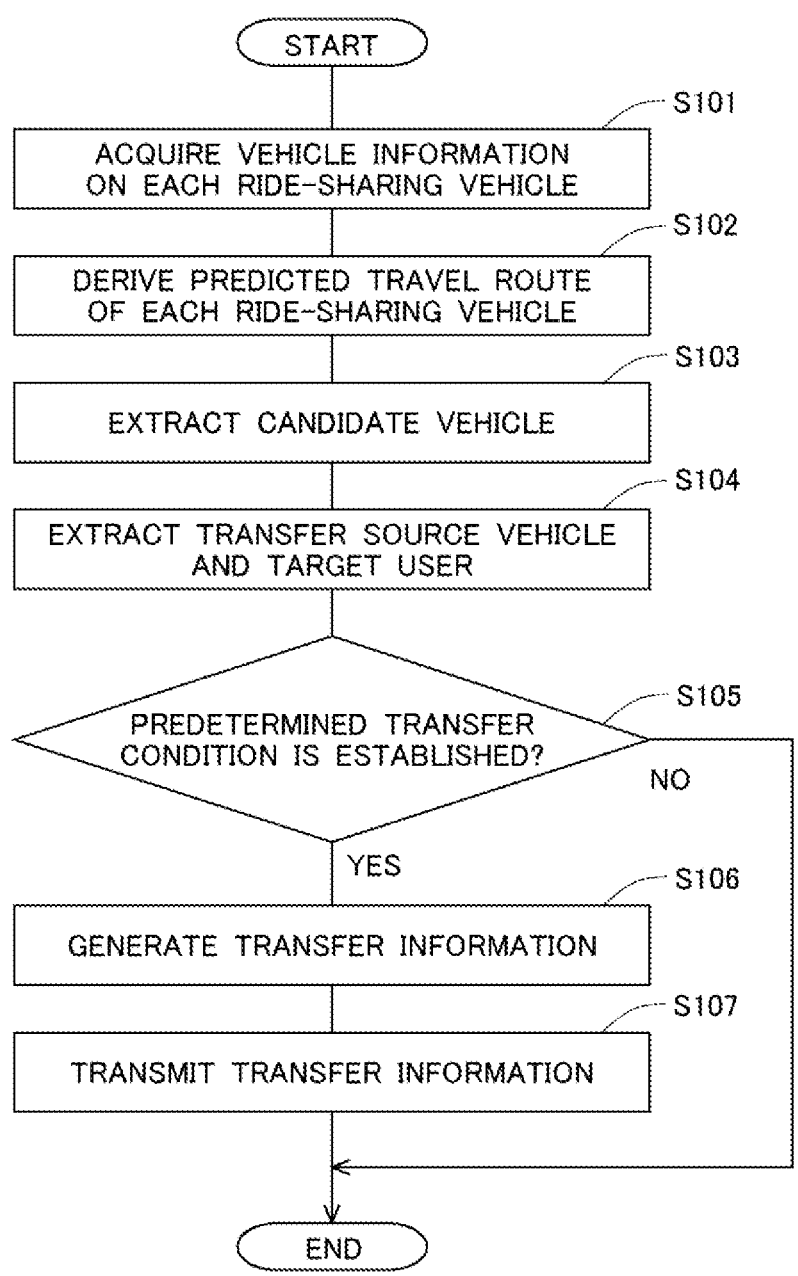
FIG. 5 is a flowchart illustrating a flow of a transfer information process according to the first embodiment.

Here, details of the transfer information process performed by the control unit 220 will be described with reference to FIGS. 5 and 6. As described above, the transfer information process is a process of urging a target user sharing a ride in one ride-sharing vehicle 10 with another user to transfer to another ride-sharing vehicle 10 during movement. FIG. 5 is a flowchart illustrating a flow of the transfer information process according to the present embodiment. FIG. 6 is a diagram illustrating an example of a table structure of the transfer information that is generated by the transfer information process.

In the flow illustrated in FIG. 5, first, in S101, the vehicle information about each ride-sharing vehicle 10 stored in the vehicle information DB 230 is acquired. Next, in S102, the predicted travel route of each ride-sharing vehicle 10 is derived from the vehicle information acquired in S101. As illustrated in FIG. 4, the vehicle information includes the destination information on each user on board the ride-sharing vehicle 10, and the current position information on the corresponding ride-sharing vehicle 10. In S102, the predicted travel route of each ride-sharing vehicle 10 is calculated on the basis of these pieces of information. Accordingly, with respect to the ride-sharing vehicle 10 on which a plurality of users with different destinations are on board, the predicted travel route calculated in S102 is a route that moves through the destination of one user, and then, heads to the destination of another user, as indicated by the arrow L1, L2 in FIG. 1, for example. Additionally, in the case where the in-vehicle apparatus 100 of each ride-sharing vehicle 10 includes a navigation device, and a travel route is set by the navigation device, the management server 200 may receive information about the travel route from the in-vehicle apparatus 100, as information about the predicted travel route of the ride-sharing vehicle 10. In this case, derivation of the predicted travel route of each ride-sharing vehicle 10 in S102 is unnecessary.

Next, in S103, a candidate vehicle which may possibly become a transfer source vehicle is extracted from a plurality of ride-sharing vehicles 10 registered in the vehicle information DB 230. Here, in the case where the number of users on board the ride-sharing vehicle 10 is one, or in the case where the destinations of a plurality of users on board the ride-sharing vehicles 10 are the same, the travel route of the ride-sharing vehicle 10 is not a route that passes through the destination of one user, and then, heads to the destination of another user. Accordingly, a user on board such a ride-sharing vehicle 10 does not have to transfer between the ride-sharing vehicles 10 during movement. On the other hand, in the case where a plurality of users with different destinations share a ride in one ride-sharing vehicle 10, as described above, there is possibly a user, among the plurality of users, who can be made a target who is urged to transfer to another ride-sharing vehicle 10 during movement. Accordingly, in S103, first, one or a plurality of ride-sharing vehicles 10 in which a plurality of users with different destinations are on board is/are extracted as candidate vehicle(s), on the basis of the vehicle information on each ride-sharing vehicle 10. For example, in the case in FIG. 1, a plurality of users with different destinations are on board each of the first vehicle and the second vehicle. Accordingly, in S103, the first vehicle and the second vehicle are extracted as the candidate vehicles.

Next, in S104, a transfer source vehicle is extracted from the one or the plurality of candidate vehicles extracted in S103, and also, a target user is extracted from the plurality of users on board the transfer source vehicle. Here, if there is a user, among a plurality of users on board one candidate vehicle, for whom the predicted travel route of the candidate vehicle is a route that moves in a roundabout way to his/her destination due to the route passing through the destination of another user before arriving at his/her destination, the one candidate vehicle is extracted as the transfer source vehicle. Furthermore, the user who is to move to his/her destination in a roundabout way is extracted as the target user. For example, as described above, in the case in FIG. 1, the first user moves to the location A, which is his/her destination, in a roundabout way by the predicted travel route of the first vehicle. Accordingly, in S104, the first vehicle is extracted as the transfer source vehicle, and the first user is extracted as the target user.

Next, in S105, whether or not a predetermined transfer condition is established for the target user extracted in S104 is determined. The predetermined transfer condition here is set as a condition by which it can be determined that the target user may more efficiently move to his/her destination by transferring to a transfer destination vehicle, which is a ride-sharing vehicle 10 other than the transfer source vehicle, during movement by the transfer source vehicle. More specifically, the predetermined transfer condition is determined to be established, in a case where there is a transfer destination vehicle with respect to which (1) a target user is able to transfer from a transfer source vehicle before the transfer source vehicle arrives at the destination of a user other than the target user, and (2) the target user is predicted to arrive earlier at his/her destination by transferring from the transfer source vehicle than by moving by staying on board the transfer source vehicle. Whether or not such a predetermined transfer condition is established is determined on the basis of the predicted travel route of each of the transfer source vehicle and the transfer destination vehicle.

For example, in FIG. 1, the predicted travel route (L1) of the first vehicle and the predicted travel route (L2) of the second vehicle, which are derived on the basis of the destination information on each user, intersect at the location X1 located before the location B on the predicted travel route (L1) of the first vehicle. Accordingly, the first user may transfer from the first vehicle to the second vehicle before the first vehicle arrives at the location B, which is the destination of the second user. That is, the condition in (1) described above is established. Furthermore, in FIG. 1, the location A, which is the destination of the first user, is on the predicted travel route of the second vehicle. Moreover, a distance from the location X1 to the location A on the predicted travel route of the second vehicle is smaller than a distance from the location X1 to the location A on the predicted travel route of the first vehicle. Accordingly, the first user is predicted to arrive earlier at the location A by transferring from the first vehicle to the second vehicle at the location X1 than by moving by staying on board the first vehicle. That is, the condition in (2) described above is established. Accordingly, in a situation as illustrated in FIG. 1, the predetermined transfer condition is determined to be established for the first user who is on board the first vehicle.

In the case where an affirmative determination is made in S105, a process in S106 is performed next. On the other hand, in the case where a negative determination is made in S105, execution of the present flow is temporarily ended. That is, the transfer information process is ended without urging the target user to transfer between the ride-sharing vehicles 10 during movement. Additionally, in the case where a plurality of users who may possibly become the target users are on board the transfer source vehicle extracted in S104, whether or not the predetermined transfer condition is established is determined for each user.

Next, in S106, transfer information for urging the target user to transfer from the transfer source vehicle to the transfer destination vehicle is generated. As illustrated in FIG. 6, a transfer information table includes a transfer source field, a transfer destination field, a target user field, and a transfer location field. A vehicle ID of the transfer source vehicle (that is, the vehicle the target user is currently on board) is input in the transfer source field. A vehicle ID of the transfer destination vehicle is input in the transfer destination field. A user ID of a target user who is a target to be urged to transfer from the transfer source vehicle to the transfer destination vehicle is input in the target user field. Transfer location information about a transfer location where the target user transfers from the transfer source vehicle to the transfer destination vehicle is input in the transfer location field.

Additionally, in FIG. 6, transfer information that is generated in S106 in a situation as illustrated in FIG. 1 is illustrated as an example of the transfer information. Accordingly, the vehicle ID of the first vehicle is input in the transfer source field, and the vehicle ID of the second vehicle is input in the transfer destination field. Furthermore, the user ID of the first user is input in the target user field. Moreover, the location X1 where the predicted travel route (L1) of the first vehicle and the predicted travel route (L2) of the second vehicle intersect is input in the transfer location field as the transfer location.

Next, in S107, the transfer information generated in S106 is transmitted to the in-vehicle apparatus 100 of each of the transfer source vehicle and the transfer destination vehicle. At this time, information about the transfer destination vehicle (such as a vehicle number) allowing the target user to visually recognize the transfer destination vehicle may be added to the transfer information that is transmitted to the in-vehicle apparatus 100 of the transfer source vehicle.

According to the transfer information process described above, in the case where the predetermined transfer condition is established for a target user sharing a ride in the transfer source vehicle with another user with a different destination, a proposal may be made to the target user to transfer to a transfer destination vehicle, and also, a user on board the transfer destination vehicle may be notified of transfer of the target user from the transfer source vehicle. The target user may thus be urged to transfer from the transfer source vehicle to the transfer destination vehicle during movement.

Accordingly, in the case where the predetermined transfer condition is established for a target user, the target user is enabled to transfer from the transfer source vehicle to the transfer destination vehicle during movement. That is, in the case where a target user may more efficiently move to his/her destination by transferring between ride-sharing vehicles 10 during movement, the target user is enabled to transfer between the ride-sharing vehicles 10. A user using ride-sharing may thus more efficiently move to the destination.

Additionally, in the present embodiment, the management server 200 corresponds to the "information processing apparatus" according to the first aspect of the present disclosure. Furthermore, in the present embodiment, the in-vehicle apparatus 100 of the transfer source vehicle corresponds to the "terminal associated with the transfer source vehicle" according to the present disclosure, and the in-vehicle apparatus 100 of the transfer destination vehicle corresponds to the "terminal associated with the transfer destination vehicle" according to the present disclosure.

Example Modification

Figure 7:
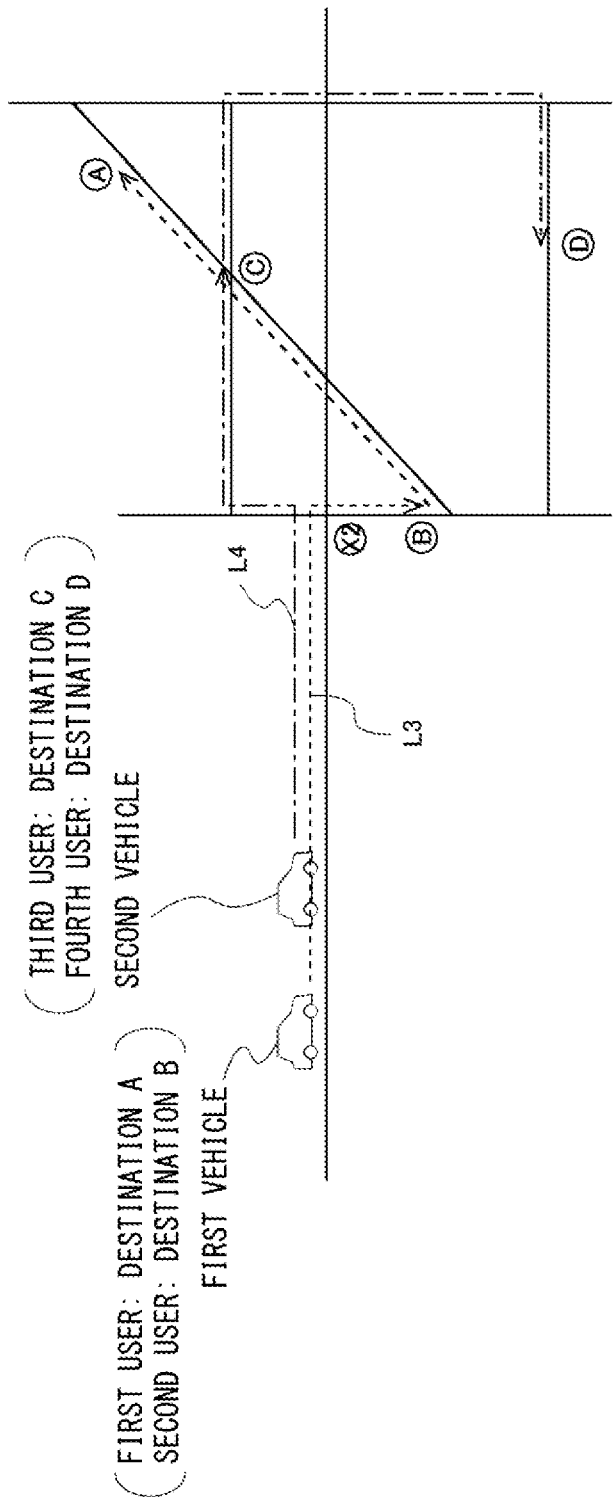
FIG. 7 is a second diagram for describing transfer between ride-sharing vehicles in the ride-sharing system.

FIG. 7 is a diagram for describing transfer between the ride-sharing vehicles, in a situation different from the situation illustrated in FIG. 1. Also in FIG. 7, a first user whose destination is a location A, and a second user whose destination is a location B share a ride in the first vehicle. Moreover, also in FIG. 7, a third user whose destination is a location C, and a fourth user whose destination is a location D share a ride in the second vehicle.

Furthermore, in FIG. 7, an arrow L3 (broken line arrow) indicates a predicted travel route that is predicted for the first vehicle. Moreover, in FIG. 7, an arrow L4 (dash-dotted arrow) indicates a predicted travel route of the second vehicle. As indicated by the arrow L3 in FIG. 7, the predicted travel route of the first vehicle is a route that heads to the location A, which is the destination of the first user, through the location B, which is the destination of the second user. Furthermore, as indicated by the arrow L4 in FIG. 7, the predicted travel route of the second vehicle is a route that heads to the location D, which is the destination of the fourth user, through the location C, which is the destination of the third user.

In FIG. 7, in the case where the first vehicle travels along the route indicated by the arrow L3, because the first vehicle heads to the location A after passing through the location B, the first user moves to the location A, which is his/her destination, in a roundabout way. Furthermore, in FIG. 7, in the case where the second vehicle travels along the route indicated by the arrow L4, because the second vehicle heads to the location D after passing through the location C, the fourth user moves to the location D, which is his/her destination, in a roundabout way.

Now, the predicted travel routes of the first vehicle and the second vehicle illustrated in FIG. 7 bifurcate at a location X2. Here, the location X2 is located before the destination of each user on the predicted travel route of each vehicle. Accordingly, a user may transfer from the first vehicle to the second vehicle, or from the second vehicle to the first vehicle, at the location X2. That is, the first user may transfer from the first vehicle to the second vehicle, and the fourth user may transfer from the second vehicle to the first vehicle, at the location X2.

Then, in the case where the first user and the four user perform such transfer between the ride-sharing vehicles 10 at the location X2, the first vehicle heads to the location D, which is the destination of the fourth user, after passing through the location B, which is the destination of the second user, and the second vehicle heads to the location A, which is the destination of the first user, after passing through the location C, which is the destination of the third user, and as a result, the first user is enabled to arrive at the location A by a shorter route than in the case of moving along the predicted travel route of the first vehicle (i.e., the arrow L3) illustrated in FIG. 7. Furthermore, the fourth user is enabled to arrive at the location D by a shorter route than in the case of moving along the predicted travel route of the second vehicle (i.e., the arrow L4) illustrated in FIG. 7. It can therefore be determined that the first user and the fourth user may more efficiently move to their respective destinations if the first user transfers from the first vehicle to the second vehicle, and the fourth user transfers from the second vehicle to the first vehicle, at the location X2, than if the first user moves by staying on board the first vehicle and the fourth user moves by staying on board the second vehicle.

Accordingly, in the case of a situation as illustrated in FIG. 7, the predetermined transfer condition may be determined, in the transfer information process performed by the control unit 220, to be established for the first user on board the first vehicle and the fourth user on board the second vehicle. Furthermore, the control unit 220 may transmit, to the in-vehicle apparatus 100 of each of the first vehicle and the second vehicle, the transfer information for urging the first user to transfer from the first vehicle to the second vehicle, and the fourth user to transfer from the second vehicle to the first vehicle, at the location X2.

Second Embodiment

With the ride-sharing system according to the first embodiment described above, the transfer information process is performed by the management server 200 while each user is on board the respective ride-sharing vehicle 10 and is moving. On the other hand, with a ride-sharing system according to a present embodiment, the transfer information process is performed together, by the management server 200, when a matching process for matching one or a plurality of users with each ride-sharing vehicle 10 is being performed.

Figure 8:
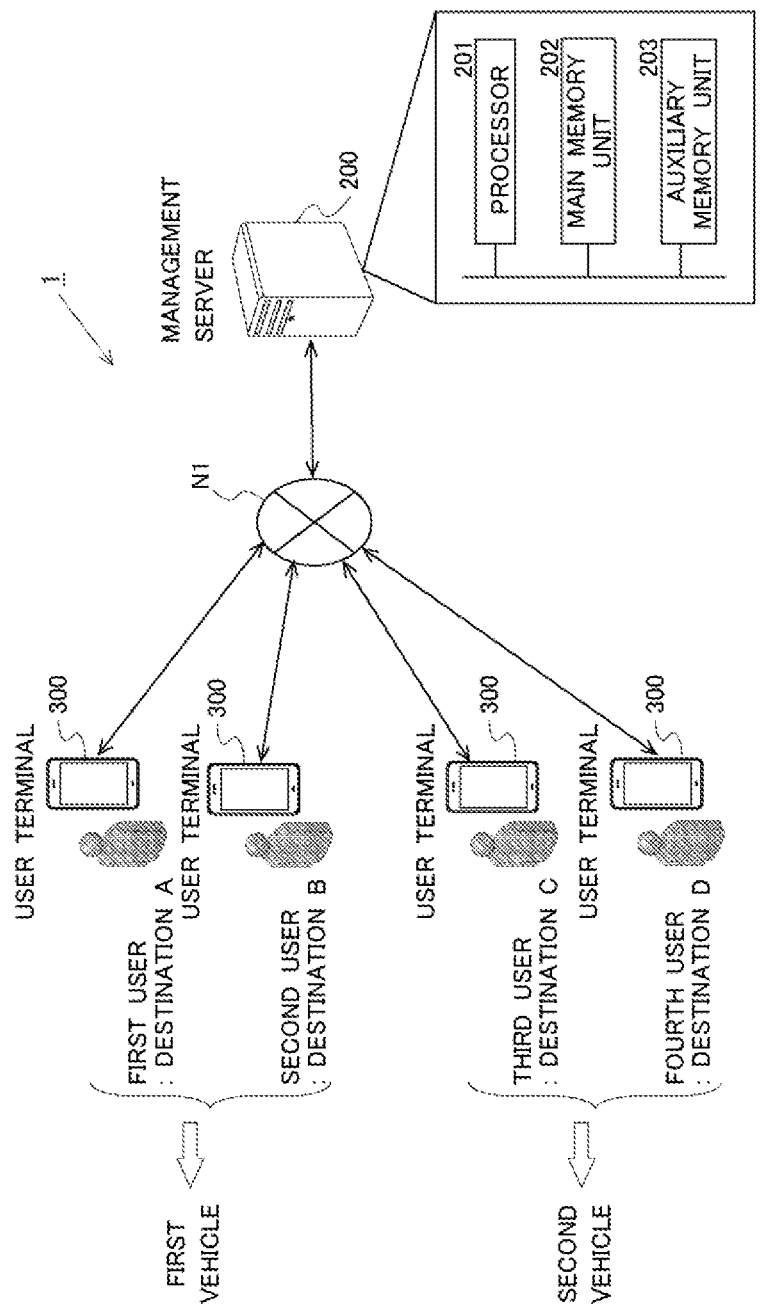
FIG. 8 is a diagram illustrating a schematic configuration of a ride-sharing system according to a second embodiment.

FIG. 8 is a diagram illustrating a schematic configuration of a ride-sharing system according to the present embodiment. A ride-sharing system 1 according to the present example includes a user terminal 300 carried by each user, and the management server 200. In the ride-sharing system 1, each user terminal 300 and the management server 200 are connected to each other over the network N1.

The user terminal 300 includes a computer including a processor, a main memory unit, and an auxiliary memory unit. As the user terminal 300, a smartphone, a tablet computer, a mobile computer, a wearable computer, a wireless storage, a mobile phone, a hand-held terminal and the like may be cited. Furthermore, the user terminal 300 may be a personal computer that is connected to the management server 200 over the network N1.

The user terminal 300 includes a communication unit, a control unit, and an input/output unit. The communication unit is communication means for connecting the user terminal 300 to the network N1. Like the communication unit 110 of the in-vehicle apparatus 100 according to the first embodiment, the communication unit may communicate with other apparatuses including the management server 200 over the network N1, by using a mobile communication service.

The control unit includes a function of performing arithmetic processing for controlling the user terminal 300. The control unit may be implemented by the processor. Furthermore, various processes by the control unit may be implemented by the processor loading programs stored in the auxiliary memory unit into the main memory unit, and executing the programs. The input/output unit is formed by a touch panel display or the like. The input/output unit includes a function of receiving input of user information from a user, and a function of displaying transfer information received from the management server 200.

A predetermined application for using the ride-sharing system 1 is installed in each user terminal 300. Each user may register user information in the management server 200 by activating the predetermined application at the user terminal 300 and performing an input operation on the input/output unit. As in the first embodiment, the user information that is registered in the management server 200 includes information about the departure point and the destination at the time of each user riding in the ride-sharing vehicle 10.

A configuration of the management server 200 is the same as that in the first embodiment. At the management server 200, a matching process is performed on the basis of the user information on each user. For example, first to fourth users illustrated in FIG. 8 are the same as the first to the fourth users illustrated in FIG. 1. That is, the first user is the user whose destination is the location A in FIG. 1, and the second user is the user whose destination is the location B in FIG. 1. Furthermore, the third user is the user whose destination is the location C in FIG. 1, and the fourth user is the user whose destination is the location D in FIG. 1. Accordingly, in the matching process, the first user and the second user are matched with the first vehicle, and the third user and the fourth user are matched with the second vehicle. Then, matching information indicating a result of the matching process is transmitted to each user terminal 300.

Furthermore, in the present embodiment, the transfer information process is performed at the management server 200 on the basis of the result of the matching process. Here, one or a plurality of users who are to ride in each ride-sharing vehicle 10 are determined at a time point of execution of the matching process. Accordingly, in the transfer information process, the predicted travel route of each ride-sharing vehicle 10 is derived on the basis of departure point information and destination information on one or a plurality of users who are to ride in each ride-sharing vehicle 10.

Furthermore, in the transfer information process, a ride-sharing vehicle 10 where a plurality of users with different destinations are on board is extracted as a candidate vehicle. Moreover, a transfer source vehicle is extracted from the extracted candidate vehicle(s), and also, a target user is extracted from a plurality of users on board the transfer source vehicle. At this time, as with the transfer information process according to the first embodiment, the transfer source vehicle and the target user are extracted on the basis of the predicted travel route of each candidate vehicle. That is, if there is a user, among a plurality of users on board one candidate vehicle, for whom the predicted travel route of the candidate vehicle is a route that moves in a roundabout way to his/her destination due to the route passing through the destination of another user before arriving at his/her destination, the one candidate vehicle is extracted as the transfer source vehicle. Furthermore, the user who is to move to his/her destination in a roundabout way is extracted as the target user.

Then, whether or not a predetermined transfer condition is established for the extracted target user is determined. The predetermined transfer condition here is the same as the predetermined transfer condition for the transfer information process according to the first embodiment. That is, the predetermined transfer condition is determined to be established, in a case where there is a transfer destination vehicle that satisfies the conditions in (1) and (2) described above. Also in the present embodiment, the predicted travel route of each ride-sharing vehicle 10 is derived, and thus, whether or not the predetermined transfer condition is established may be determined for the target user.

Then, in the case where the predetermined transfer condition is determined to be established for the target user, the transfer information is transmitted to the user terminal 300 of each user who is matched with the transfer source vehicle, including the target user, and to the user terminal 300 of each user matched with the transfer destination vehicle. That is, according to the transfer information process according to the present embodiment, the transfer information is transmitted to the user terminal 300 of each user at a time point before each user who is to get on board the transfer source vehicle and each user who is to get on board the transfer destination vehicle get on board their respective vehicles.

Accordingly, a target user may be urged to transfer from the transfer source vehicle to the transfer destination vehicle during movement, in the same manner as with the transfer information process according to the first embodiment.

However, in the present embodiment, the transfer information process is performed using predicted travel routes that are predicted at a time point before the transfer source vehicle and the transfer destination vehicle actually start to move to the destinations of respective users. On the other hand, in the first embodiment, the transfer information process is performed using the predicted travel routes while the transfer source vehicle and the transfer destination vehicle are actually moving toward the destinations of respective users. Accordingly, with the transfer information process according to the first embodiment, whether or not the predetermined transfer condition is established for the target user may be more accurately determined.

Additionally, also in the present embodiment, the management server 200 corresponds to the "information processing apparatus" according to the first aspect of the present disclosure. Furthermore, in the present embodiment, the user terminal 300 of each user matched with the transfer source vehicle corresponds to the "terminal associated with the transfer source vehicle" according to the present disclosure, and the user terminal 300 of each user matched with the transfer destination vehicle corresponds to the "terminal associated with the transfer destination vehicle" according to the present disclosure. However, in the present embodiment, the transfer information does not necessarily have to be transmitted to the user terminals of all the users who are matched with the transfer source vehicle, and the user terminals of all the users who are matched with the transfer destination vehicle. For example, the transfer information may be transmitted only to the user terminal of the target user, and the user terminals of a driver of the transfer source vehicle and a driver of the transfer destination vehicle.

Third Embodiment

In a present embodiment, a transfer location where a target user transfers from a transfer source vehicle to a transfer destination vehicle is selected in a transfer information process from a plurality of candidate locations that are registered in advance. Here, a shop or a house with a parking lot may be cited as examples of the candidate location. In these cases, an owner of the shop or the house may register permission to use the parking lot as a transfer location of the ride-sharing system 1.

(System Configuration)

Figure 9:
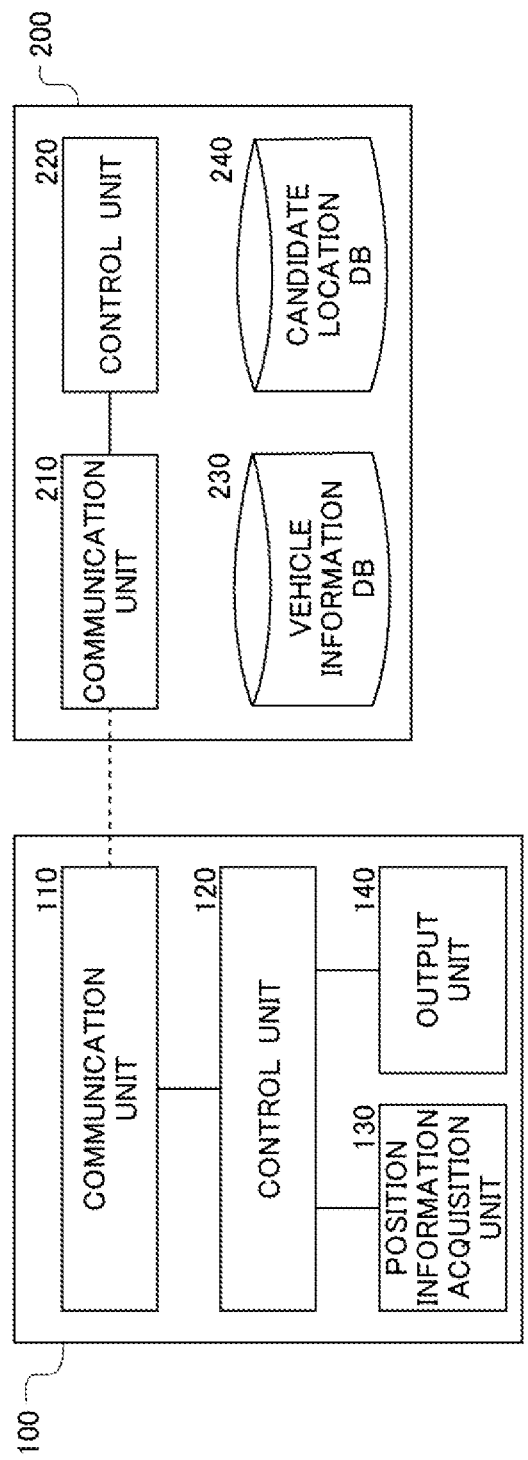
FIG. 9 is a block diagram schematically illustrating an example configuration of each of an in-vehicle apparatus and a management server forming a ride-sharing system according to a third embodiment.

FIG. 9 is a block diagram schematically illustrating an example configuration of each of the in-vehicle apparatus 100 and the management server 200 forming the ride-sharing system 1 according to the present embodiment. As illustrated in FIG. 9, in the present embodiment, the management server 200 includes a candidate location database (candidate location DB) 240, in addition to the vehicle information DB 230. Like the vehicle information DB 230, the candidate location DB 240 is structured in the auxiliary memory unit 203 of the management server 200. A plurality of candidate locations that can be used as the transfer locations of the ride-sharing system 1 are registered in advance in the candidate location DB 240.

The configuration is otherwise the same as that of the ride-sharing system according to the first embodiment. Additionally, the present embodiment may also be applied to the ride-sharing system according to the second embodiment. That is, the management server 200 of the ride-sharing system according to the second embodiment may also include the candidate location DB.

(Transfer Information Process)

Figure 10:
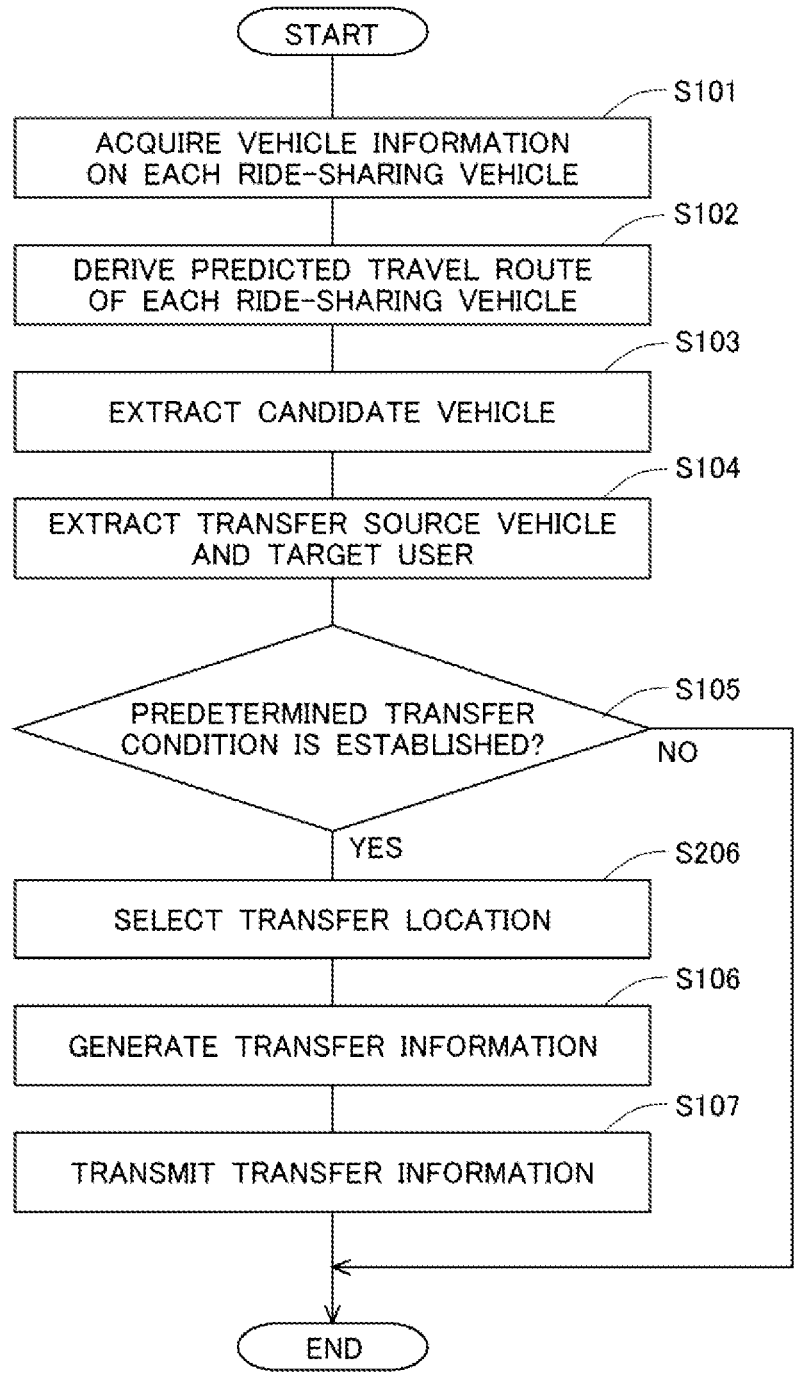
FIG. 10 is a flowchart illustrating a flow of a transfer information process according to the third embodiment.

FIG. 10 is a flowchart illustrating a flow of a transfer information process according to the present embodiment. Steps of the present flow other than S206 are the same as respective steps in the flow illustrated in FIG. 5. Accordingly, a description of steps other than S206 will be omitted.

In the flow illustrated in FIG. 10, in the case where an affirmative determination is made in S105, in other words, in the case where the predetermined transfer condition is determined to be established for a target user, a process in S206 is performed next. In S206, a transfer location where the target user transfers from the transfer source vehicle to the transfer destination vehicle is selected from a plurality of candidate locations that are registered in the candidate location DB 240. At this time, the transfer location is selected on the basis of the predicted travel route of each of the transfer source vehicle and the transfer destination vehicle.

For example, in a situation as illustrated in FIG. 1, the predicted travel route (L1) of the first vehicle and the predicted travel route (L2) of the second vehicle intersect at the location X1. In such a case, a candidate location closest to the location X1 may be selected as the transfer location, from the plurality of candidate locations that are registered in the candidate location DB 240. Furthermore, in a situation as illustrated in FIG. 2, the predicted travel route (L3) of the first vehicle and the predicted travel route (L4) of the second vehicle bifurcate at the location X2. In such a case, a candidate location closest to the location X2 may be selected as the transfer location, from the plurality of candidate locations that are registered in the candidate location DB 240.

Then, in the present flow, the candidate location selected as the transfer location in S206 is input to the transfer location field in the transfer information that is generated in S106.

According to the present embodiment, in the case where a target user transfers between the ride-sharing vehicles 10, such transfer may be performed at a candidate location that is registered in advance. Transfer of the target user between the ride-sharing vehicles 10 may thus be more smoothly performed.

Additionally, also in the present embodiment, the management server 200 corresponds to the "information processing apparatus" according to the first aspect of the present disclosure.

Example Modification

In the third embodiment described above, in the case where a candidate location which is input as the transfer location in the transfer information transmitted from the management server 200, in other words, a candidate location which is selected as the transfer location by the transfer information process, is actually used for transfer of the target user between the ride-sharing vehicles 10, the management server 200 may receive use information indicating such a situation. In this case, the user information may be transmitted from the in-vehicle apparatus of the transfer source vehicle, or the in-vehicle apparatus of the transfer destination vehicle, for example. Furthermore, the use information may be transmitted from a user terminal carried by the target user, for example.

Figure 11:
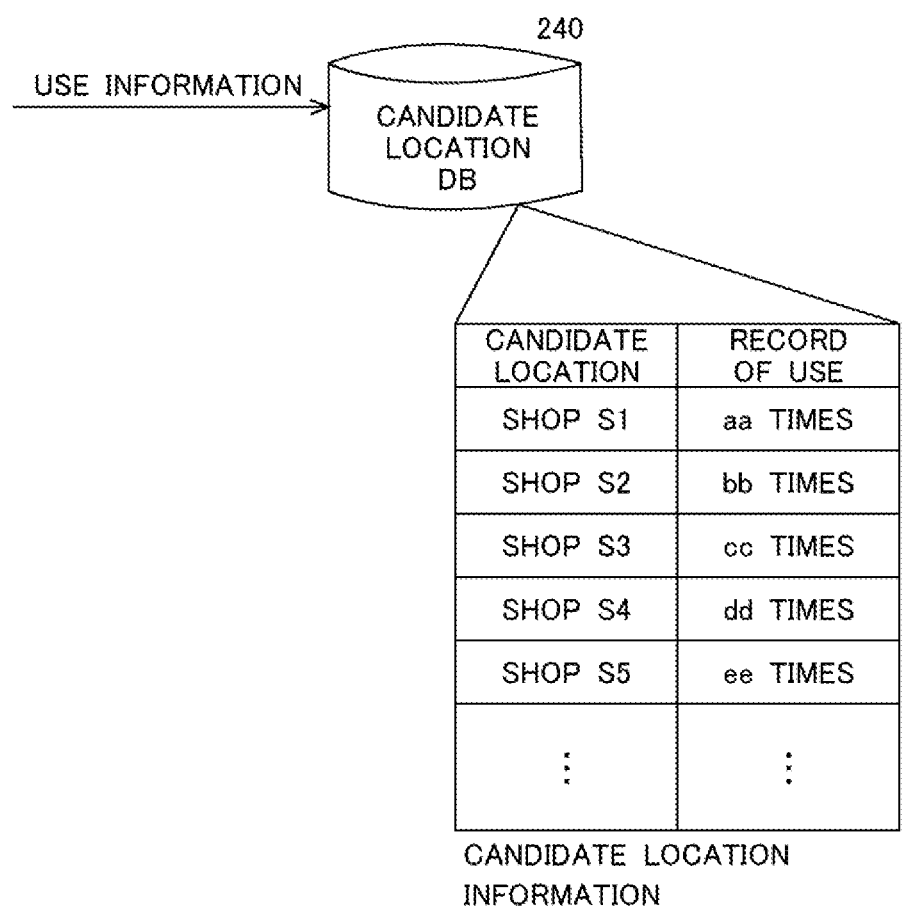
FIG. 11 is a diagram illustrating an example of a table structure of candidate location information that is stored in a candidate location DB.

Moreover, in the case where the management server 200 is to receive the use information about a candidate location, the management server 200 may store a record of use of the candidate location in the candidate location DB 240. FIG. 11 is a diagram illustrating an example of a table structure of candidate location information that is stored in the candidate location DB 240 according to the present example modification. A candidate location information table includes a candidate location field and a record-of-use field.

Each candidate location is input in the candidate location field. Furthermore, the number of times each candidate location is actually used for transfer between the ride-sharing vehicles 10 is input in the use-of-record field as the record of use. When the management server 200 receives the use information about one candidate location, the record of use of the one candidate location in the record-of-use field is updated.

According to the present example modification, the record of actual use may be grasped for each of a plurality of candidate locations that are registered in advance and that can be used as the transfer location.

OTHER EMBODIMENTS

The embodiments described above are merely examples, and the present disclosure may be embodied while being changed as appropriate within the scope of the present disclosure. The processes and means described in the present disclosure may be freely combined and embodied to the extent that no technical conflicts exist.

Furthermore, a process that is described to be performed by one apparatus may be shared and performed by a plurality of apparatuses. Processes described to be performed by different apparatuses may be performed by one apparatus. Which function is to be implemented by which hardware configuration (server configuration) in a computer system may be flexibly changed.

The present disclosure may also be implemented by supplying computer programs for implementing the functions described in the embodiments described above to a computer, and by one or more processors of the computer reading out and executing the programs. Such computer programs may be provided to the computer by a non-transitory computer-readable storage medium that can be connected to a system bus of the computer, or may be provided to the computer through a network. The non-transitory computer-readable storage medium may be any type of disk including magnetic disks (floppy (registered trademark) disks, hard disk drives (HDDs), etc.) and optical disks (CD-ROMs, DVD discs, Blu-ray discs, etc.), read-only memories (ROMs), random access memories (RAMs), EPROMs, EEPROMs, magnetic cards, flash memories, optical cards, and any type of medium suitable for storing electronic instructions.

What is claimed is:

1. An information processing apparatus comprising a controller configured to:
   determine, while a transfer source vehicle is in motion and while a transfer destination vehicle is in motion, on a basis of a predicted travel route of each of the transfer source vehicle and the transfer destination vehicle, whether or not a predetermined transfer condition is established, the predetermined transfer condition being information urging a target user sharing a ride in the transfer source vehicle with another user with a different destination to transfer from the transfer source vehicle to the transfer destination vehicle;
   determine a first predicted arrival time to a destination of the target user, the first predicted arrival time being based on the target user transferring from the transfer source vehicle to the transfer destination vehicle;

determine a second predicted arrival time to the destination of the target user, the second predicted arrival time being based on the target user remaining on board the transfer source vehicle; and transmit, while the transfer source vehicle is in motion and while the transfer destination vehicle is in motion, in a case where the predetermined transfer condition is determined to be established, transfer information to a terminal associated with the transfer source vehicle and a terminal associated with the transfer destination vehicle, the transfer information being information urging the target user to transfer from the transfer source vehicle to the transfer destination vehicle, wherein:

when the first predicted arrival time is earlier than the second predicted arrival time, the predetermined transfer condition is established.

2. The information processing apparatus according to claim 1, wherein the controller is further configured to select, from a plurality of candidate locations registered in advance, a transfer location where the target user transfers from the transfer source vehicle to the transfer destination vehicle, on a basis of the predicted travel route of each of the transfer source vehicle and the transfer destination vehicle, and the transfer information includes information about the transfer location that is selected.

3. The information processing apparatus according to claim 2, wherein the controller is further configured to acquire, in a case where the candidate location that is selected as the transfer location is actually used for transfer of the target user from the transfer source vehicle to the transfer destination vehicle, use information indicating such a situation.

4. An information processing method performed by a computer, the method comprising steps of:

determining, while a transfer source vehicle is in motion and while a transfer destination vehicle is in motion, on a basis of a predicted travel route of each of the transfer source vehicle and the transfer destination vehicle, whether or not a predetermined transfer condition is established, the predetermined transfer condition being information urging a target user sharing a ride in the transfer source vehicle with another user with a different destination to transfer from the transfer source vehicle to the transfer destination vehicle;

determining a first predicted arrival time to a destination of the target user, the first predicted arrival time being based on the target user transferring from the transfer source vehicle to the transfer destination vehicle;

determining a second predicted arrival time to the destination of the target user, the second predicted arrival time being based on the target user remaining on board the transfer source vehicle; and transmitting, while the transfer source vehicle is in motion and while the transfer destination vehicle is in motion, in a case where the predetermined transfer condition is determined to be established, transfer information to a terminal associated with the transfer source vehicle and a terminal associated with the transfer destination vehicle, the transfer information being information urging the target user to transfer from the transfer source vehicle to the transfer destination vehicle, wherein when the first predicted arrival time is earlier than the second predicted arrival time, the predetermined transfer condition is established.

5. A non-transitory computer readable storage medium storing a computer-executable program that, when executed, causes a computer to:

determine, while a transfer source vehicle is in motion and while a transfer destination vehicle is in motion, on a basis of a predicted travel route of each of the transfer source vehicle and the transfer destination vehicle, whether or not a predetermined transfer condition is established, the predetermined transfer condition being information urging a target user sharing a ride in the transfer source vehicle with another user with a different destination to transfer from the transfer source vehicle to the transfer destination vehicle;

determine a first predicted arrival time to a destination of the target user, the first predicted arrival time being based on the target user transferring from the transfer source vehicle to the transfer destination vehicle;

determine a second predicted arrival time to the destination of the target user, the second predicted arrival time being based on the target user remaining on board the transfer source vehicle; and transmit, while the transfer source vehicle is in motion and while the transfer destination vehicle is in motion, in a case where the predetermined transfer condition is determined to be established, transfer information to a terminal associated with the transfer source vehicle and a terminal associated with the transfer destination vehicle, the transfer information being information urging the target user to transfer from the transfer source vehicle to the transfer destination vehicle, wherein when the first predicted arrival time is earlier than the second predicted arrival time, the predetermined transfer condition is established.

\* \* \* \* \*